United States Patent [19]
Knudsen

[11] 3,854,091
[45] Dec. 10, 1974

[54] DIRECT CURRENT CONVERTER FOR ISOLATING A MEASURING TRANSDUCER FROM ITS POWER SOURCE

[75] Inventor: Ole Friis Knudsen, Sonderborg, Denmark

[73] Assignee: Danfoss A/S, Nordborg, Denmark

[22] Filed: Nov. 15, 1973

[21] Appl. No.: 416,180

[30] Foreign Application Priority Data
Nov. 20, 1972 Germany............................ 2256881

[52] U.S. Cl.............. 324/118, 321/8 R, 323/56, 330/10, 332/51, 340/186, 340/197
[51] Int. Cl.............................................. G01r 19/18
[58] Field of Search......... 324/117 R, 118; 340/186, 340/197; 330/8, 9, 10; 321/8 R; 332/51; 323/56

[56] References Cited
UNITED STATES PATENTS

| | | |
|---|---|---|
| 2,623,205 | 12/1952 | McCreary............................ 323/56 |
| 2,703,388 | 3/1955 | McCreary.............................. 330/8 |
| 2,815,499 | 12/1957 | Brynes................................ 340/197 |
| 2,832,052 | 4/1958 | Heartz............................... 332/51 R |
| 2,870,416 | 1/1959 | Heartz............................... 332/51 R |
| 3,483,476 | 12/1969 | Kobayashi et al. ................... 330/10 |
| 3,503,261 | 3/1970 | Riester et al....................... 340/186 |
| 3,581,184 | 5/1971 | Hurd....................................... 321/2 |

Primary Examiner—William H. Beha, Jr.

[57] ABSTRACT

A direct-current converter, for isolating a measuring transducer from its power source, comprises a magnetic core with primary, secondary and sensor windings. Additionally an energizing winding is provided periodically to change the magnetic inductance of the core, by developing a magnetic field at right angles to that of the other three windings.

10 Claims, 2 Drawing Figures

DIRECT CURRENT CONVERTER FOR ISOLATING A MEASURING TRANSDUCER FROM ITS POWER SOURCE

The invention relates to direct-current converter particularly for the electrical separation of a measured-value transducer from its connecting leads, in which converter a magnet core carries a primary winding, a secondary winding and a sensor winding in which a control voltage is induced when differences in flux occur, the converter also having a regulator for the secondary current which so adjusts this current in dependence upon the control voltage that the flux difference becomes zero.

In a known direct-current converter (U.S. Pat. No. 3,581,184) the direct current supplied from a measuring point is passed through a resistor with which there is connected in parallel a series arrangement comprising a further resistor, an electronic circuit breaker and the primary winding. The regulator for the secondary current is likewise connected in series with a resistor which is connected in parallel with the series arrangement comprising a second resistor, an electronic circuit breaker and the secondary winding. Connected on the output side of the sensor winding are an alternating-current amplifier, a demodulator and a direct-current amplifier as the regulator for the secondary current. The two electronic circuit breakers and the demodulator are controlled in synchronism. This switching arrangement is complicated and expensive since a chopped signal porportional to the primary or secondary direct current must first be generated. Since there is a circuit breaker on the primary side and on the secondary side of the converter, the synchronization signal must also be transmitted through a transformer. In this system there occur time displacements that are dependent also upon temperature, so that accuracy in transmission suffers. The above-mentioned parallel resistors are necessary in order to maintain the currents on the primary and secondary sides of the transformer, in view of the intermittent breaking of the circuits. This results in division of current on each side of the transformer at the parallel resistor on the one hand and at the circuit breaker or a transformer winding on the other. With this division of current, it is necessary to connect stable resistors in series with the circuit breakers in order to minimize the effects of the response of the windings to temperature. Consequently, a considerably reduced signal is obtained, so that the number of turns must be increased in order to provide a sufficiently strong signal.

The object of the invention is to provide a direct-current converter of the initially described kind which has greater accuracy, while its circuitry is less complicated and costly.

According to the invention, this object is achieved by supplying the primary winding and secondary winding with constant direct current, and by the core also carrying an energizing winding, the field of which is at right-angles to that of the other three windings and which is supplied with an energizing current which periodically changes the magnetic induction of the core.

In this converter the primary current and the secondary current can be passed directly through the primary winding and the secondary winding. The primary current produces a magnetic flux in a first direction, and the secondary current a magnetic flux in the opposite direction. If the currents are different, a flux equal to the difference passes through the sensor winding. Since the flux is constant, the sensor winding would remain unaffected if the energizing winding were to break down. The energizing current in the energizing winding produces a periodically varying magnetic flux which is not interlinked with the other three windings and which therefore does not induce voltage in them. However, since it periodically alters the induction, i.e., the state of saturation of the core and therefore its permeability, a periodic change occurs in the flux interlinked with the sensor winding if a difference in flux is present simultaneously at the primary and secondary sides because of differing numbers of ampere turns. The signal that is consequently induced in the sensor winding is used, with the aid of the regulator, to adjust the secondary current to such extent that equilibrium in the ampere turns is re-established.

In this arrangement, instead of two circuit breakers on the primary side and the secondary side, all that is needed is a device for producing a periodically varying energizing current. This switching arrangement may be of very simple form. There is no need for a special form, e.g., a square-wave form, of energizing current or for this current to be of a precise magnitude, provided that it is ensured that the state of saturation of the magnet core changes, since the magnitude of the signal generated in the sensor winding is also immaterial because the regulator varies the secondary current in each case to the point at which equilibrium in the ampere turns is established. Since it is not necessary to provide two circuit breakers on different sides of the converter, no synchronization signal needs to be transmitted through a transformer.

Particular advantage is achieved if the core is a hollow toroid around which the primary, secondary and sensor windings are coiled in toroidal form, the energizing winding being fitted in the cavity of the core in the form of a solenoid. The magnetic flux produced by the primary current and the secondary current then runs parallel to the energizing winding in the peripheral direction of the toroid, and the magnetic flux produced by the energizing current runs in radial planes, i.e. at right-angles to the first-mentioned flux.

The current is preferably formed by a train of direct-current pulses. Since the direct-current converter is generally used in a direct-current system in any case, such energizing current can be produced very readily.

For example, the energizing winding supplied with direct-current voltage may be bridged by an intermittently actuated electronic switch.

In a preferred arrangement, the secondary side is connected through two supply conductors to a voltage source and a measured-value indicator, and at least that current flowing through the switch and the energizing winding, and preferably the entire operating current, is passed through the secondary winding with the regulator interposed. Thus a converter for a two-line telemetering system can be obtained in which the secondary current flowing to the central station is a precise copy of the primary current emanating from the measuring point, but at the same time performs other functions in the converter. This brings out the advantage of the operation of the converter not being affected by a change in the magnitude of the energizing current.

Preferably the voltage induced in the sensor winding is amplified in an alternating-current amplifier, a signal for controlling the regulator is generated in a demodulator, and an oscillator controlling the electronic switch also controls in synchronism therewith the demodulator. In this arrangement too, the synchronization signal does not need to be transmitted through a transformer since the demodulator and the energizing winding are supplied from the secondary side.

It is even possible to supply the primary side from a voltage source which is disposed on the secondary side and which feeds the first winding of an additional transformer by way of an oscillator, the second winding of said additional transformer being connected to a rectifier arrangement which is in series with the primary winding and the measured-valve transducer. The current required for feeding the measured-value transducer on the primary side is thus supplied without adversely affecting the operation of the direct-current converter.

In this arrangement, a single oscillator can be provided for the electronic switch, the demodulator and the additional transformer. This leads to a very simple form of switching arrangement.

It is also preferred to connect the oscillator in series with the parallel arrangement constituted by the energizing winding and the electronic switch. The current passed to the primary side will thus have previously flowed through the energizing winding or the switch that bridges it.

Further advantage is achieved if a series arrangement consisting of a constant-current regulator and a constant-voltage element is connected between that supply conductor not connected to the secondary winding and that connection of the regulator remote from the secondary winding, and the constant voltage tapped at that point is supplied to the alternating-current amplifiers and any other groups of components that may be present. The constant-current regulator ensures that there is always sufficient current available for supplying the constant-voltage element and said groups of components.

The invention will now be described in greater detail by reference to an embodiment illustrated in the drawing, in which.

Figure 1:
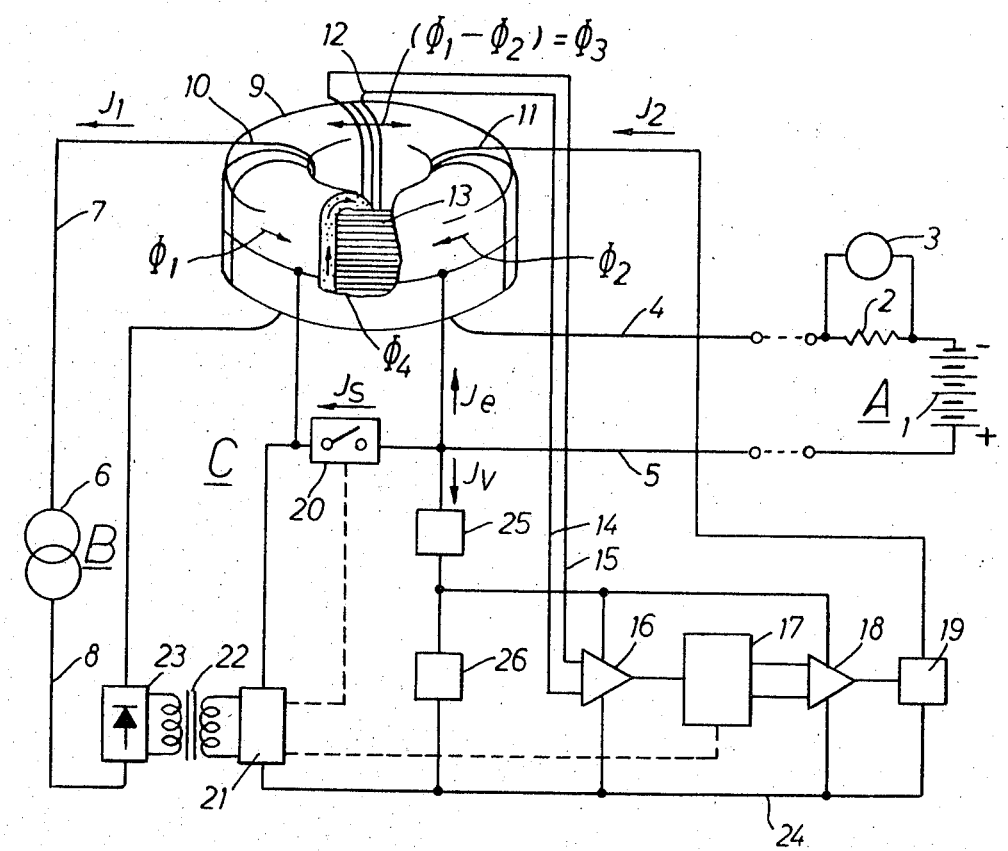
FIG. 1 shows a block circuit diagram in accordance with the invention.

A central voltage source 1 and a measuring impedance 2 in series therewith and bridged by an indicating instrument 3 are provided in a central station A. This station is connected through two supply conductors 4 and 5 to a measuring point B which has a measured-value transducer 6 which converts any selected measured value, e.g. that of temperature, into an electrical quantity. This measured-value transducer 6 is connected by two leads 7 and 8 to a point C of electrical-separation, which takes the form of a direct-current converter.

At this point of separation C there is provided a magnetic core 9 in the form of a hollow toroid which consists of two halves of ferro-magnetic material. The magnetic core carries a primary winding 10 which is contained in the primary circuit that includes the measured-value transducer 6, a secondary winding 11 which is contained in the secondary circuit that includes the central station A, a sensor winding 12 and an energising winding 13. Whereas the three first-mentioned windings are wound around the core 9 in toroidal form, the energizing winding 13 is disposed in the cavity of the core toroidal form of a solenoid. Consequently, the primary current $I_1$ produces a magnetic flux $\phi 1$ in the magnet core 9, and the secondary current $I_2$ produces a flux $\phi_2$ which extends in the opposite direction, which two fluxes should be kept equal to each other. This is the case when the product of the current and the number of turns is the same on the primary side and the secondary side. A flux equal to the difference $\phi_3 = (\phi_1 - \phi_2)$, passes through the sensor winding 12. The flux $\phi_4$ produced by the energizing winding 13 runs at right angles to the first-mentioned magnetic fluxes, as shown in FIG. 1. This flux is produced with the aid of an periodically varying energizing current $I_e$ which periodically alters the state of saturation of the magnet core 9; if a flux difference $\phi_3$ occurs simultaneously with the varying flux $\phi_4$ an alternating-current voltage is induced in the sensor winding 12.

This alternating-current voltage is passed through a pair of leads 14 and 15 to an alternating-current amplifier 16. The amplified signal is rectified in a demodulator 17, is amplified again in a direct-current amplifier 18 and controls a regulator 19 arranged in series with the secondary winding 11. As soon as the sensor winding 12 detects a disturbance in the ampere-turn equilibrium between the primary and secondary sides, regulation occurs and continues until equilibrium is re-established.

For the purpose of producing the periodically varying energizing current $I_e$ an electronic switch 20 is connected in parallel with the energizing winding 13, this switch opening and closing at a frequency determined by an oscillator 21. The demodulator 17 is also strobed at the same frequency. Consequently, the phase relationship of the voltage induced in the sensor winding 12 can be determined, and with it it is possible to ascertain whether the secondary current $I_2$ is too great or too small. The oscillator 21 is in series with the parallel arrangement constituted by the energizing winding 13 and the switch 20. The oscillator also feeds an additional transformer 22 which transmits a current to the primary side and there supplies a rectifier arrangement 23 with current. The magnitude of the primary current is determined by the measured-value transducer 6 which for example lets through a constant continuous current and, superposed thereon, a varying signal current.

A series arrangement consisting of a constant-current regulator 25 and a constant-voltage signal generator 26 is connected between the supply conductor 5 and a lead 24 connecting the oscillator 21 to the regulator 19. The voltage that can be tapped off at the signal generator 26 feeds the arrangement connected on the output side thereof. The supply current $I_{1'}$ for the constant-voltage signal generator 26 and the other groups of components 16 and 18 is kept approximately constant by the constant-current regulator 25 through which it flows.

The secondary current $I_2$, which consists of the supply current $I_v$ and the energizing current $I_e$ or, when the switch 20 is closed, the switching current $I_s$, flows through the current regulator 19 and the secondary winding 11 connected thereto. Due to the setting of the current regulator 19, the energizing current $I_e$ and the switching current $I_s$ are equal. However they may vary in dependence upon the imposed magnitude of the secondary current $I_2$.

Figure 2:
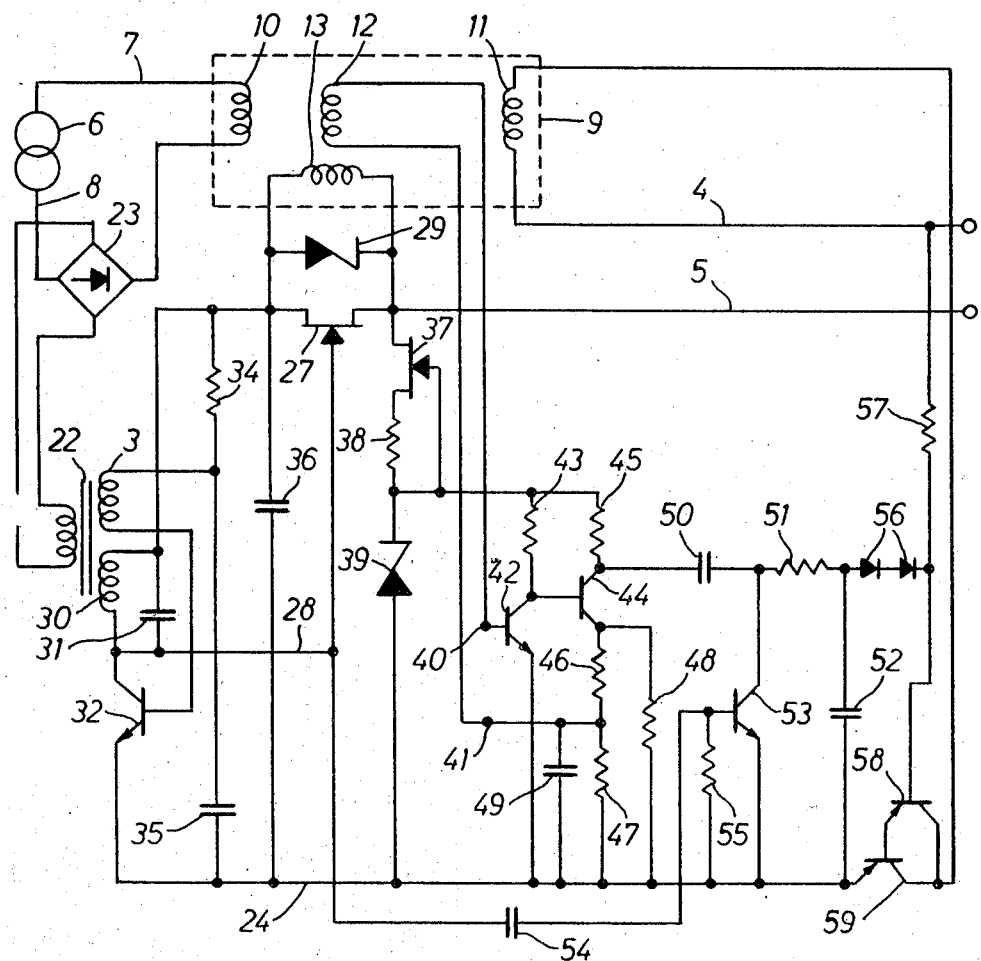
FIG. 2 shows an example of the circuitry.

FIG. 2 shows a circuit arrangement in which the same reference numerals as before are used for parts similar to those previously mentioned.

The switch 20 consists of a transistor 27 which by way of a lead 28 is controlled by the oscillator 21 alternately into the conducting and blocked condition. The energizing winding 13 is bridged by a Zener diode 29 which prevents excessively high currents from flowing through the energizing winding 13.

The oscillator has an oscillatory circuit consisting of a coil 30 and a condenser 31 in series with the collector-emitter path of a transistor 32. The oscillatory circuit feeds back to the base of this transistor 32 through a second coil 33. The voltage for the feed-back is tapped from a series arrangement consisting of a resistor 34 and a condenser 35. This series arrangement is connected in parallel with a further condenser 36.

The current regulator has a transistor 37 which is controlled by the voltage-drop at a series resistor 38. A Zener diode 39 is connected in series with this resistor.

The sensor winding 12 is connected to the two terminals 40 and 41 of the alternating-current amplifier 16. The latter has a transistor 42 with a collector resistor 43, and a second transistor 44 which is controlled by the collector voltage of the resistor 43 and has a collector resistor 45 and an emitter load consisting of the resistor 46, 47 and 48 and of a condenser 49.

The output of this amplifier is applied to the demodulator 17 through a condenser 50. a condenser 50. The demodulator has a series arrangement consisting of a resistor 51 and a condenser 52 which is connected in parallel with the collector-emitter path of a transistor 53. The oscillator output lead 23 is connected to the lead 24 by way of a condenser 54 and a resistor 55. The voltage-drop at the resistor 55 brings the transistor 53 alternately into the conducting and blocking conditions. Consequently the condenser 52 is charged to a voltage, the magnitude of which is proportional to that of the voltage induced in the sensor winding 12.

The point between the resistor 51 and the condenser 52 is connected to the supply conductor 4 by way of two diodes 56 and a resistor 57. The voltage at the connecting point between the diodes 56 and the resistor 57 is present at the base of a transistor 58 which, together with a transistor 59, forms a Darlingly arrangement which consistutes the direct-current amplifier 18 and the regulator 19.

I claim:

1. A direct-current converter suitable for electrically isolating a measuring transducer from the power source for the measuring transducer, the converter comprising:

a magnetic core;
   a primary winding on said core;
   a secondary winding on said core;
   means for supplying respective substantially constant direct currents to said primary and secondary windings;
   a sensor winding on said core in which sensor winding a control voltage is developed when a difference occurs between the magnetic flux due to currents in said primary and said secondary winding respectively;
   a regulator for adjusting said direct current supplied to said secondary winding in dependence upon said control voltage such that said magnetic flux difference tends to zero;
   an energising winding for developing in said core a magnetic field at right angles to magnetic fields associated with said primary, secondary and sensor winding; and
   means for supplying an energising current to said energising winding for periodically changing the magnitude of the magnetic induction of said core.

2. A direct-current converter according to claim 1 wherein said core is a toroid having an internal hollow cavity, said primary, secondary and sensor windings are wound in toroidal form on said core, and said energizing winding is wound in said cavity in the form of a solenoid.

3. A direct-current converter according to claim 1 wherein said energizing current is formed by a train of direct-current pulses.

4. A direct-current converter according to claim 3 wherein said means for supplying an energizing current comprises means for supplying a direct-current voltage to said energising winding, and a periodically actuated electronic switch in parallel with said energising windings.

5. A direct-current converter according to claim 4 comprising two supply conductors for connecting said secondary winding to said power source and to a measured value indicator, and wherein the entire operating current is passed through said secondary winding.

6. A direct-current converter according to claim 4 comprising an alternating current amplifier having an input connected to said sensor winding, and an output; a demodulator having an input connected to said output of said amplifier and an output from which a signal is supplied to said regulator; and an oscillator which in use supplies a signal to control said switch and said demodulator in synchronism.

7. A direct-current converter according to claim 1 comprising a measuring transducer, a power source for the measuring transducer, a transformer having a first and a second winding, an oscillator having an input and an output, and a rectifier; said power source being connected to said secondary winding and to said input of said oscillator, said output of said oscillator being connected to said first winding of said transformer, and said second winding of said transformer being connected to said rectifier which is connected in series with said transducer and said primary winding.

8. A direct-current converter according to claim 7 comprising an electronic switch in parallel with said energizing winding, said oscillator being in series with the parallel-connected electronic switch and energising winding.

9. A direct-current converter according to claim 1 comprising a measuring transducer, a power source for the measuring transducer, said power source having two output conductors, one of which is connected to said secondary winding, and a constant-current regulator and constant-voltage element connected in series between the other output conductor of said power source and said regulator.

10. A direct-current converter according to claim 1 comprising a Zener diode connected in parallel with said energizing winding.

* * * * *